United States Patent
Wu et al.

(10) Patent No.: US 12,481,617 B2
(45) Date of Patent: Nov. 25, 2025

(54) SYSTEM ON A CHIP AND DISPLAY SYSTEM

(71) Applicant: Realtek Semiconductor Corp., HsinChu (TW)

(72) Inventors: Cheng-Hung Wu, HsinChu (TW); Wen-Hsia Kung, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 344 days.

(21) Appl. No.: 18/137,432

(22) Filed: Apr. 20, 2023

(65) Prior Publication Data

US 2023/0409516 A1     Dec. 21, 2023

(30) Foreign Application Priority Data

May 25, 2022   (TW) ................................. 111119478

(51) Int. Cl.
*G06F 15/76*      (2006.01)
*G06F 9/448*      (2018.01)
*G06F 15/78*      (2006.01)
*G10L 13/00*      (2006.01)

(52) U.S. Cl.
CPC ........ *G06F 15/7807* (2013.01); *G06F 9/4498* (2018.02); *G10L 13/00* (2013.01)

(58) Field of Classification Search
CPC ..... G06F 15/7807; G06F 9/4498; G10L 13/00
See application file for complete search history.

(56) References Cited

U.S. PATENT DOCUMENTS

2018/0279099 A1\*  9/2018  Novo Diaz ............. H04W 4/70
2018/0293046 A1\* 10/2018  Nakata ................. G11B 27/005

FOREIGN PATENT DOCUMENTS

CN      113689810 A     11/2021
TW      200707239        2/2007

OTHER PUBLICATIONS

Chiang, the specification, including the claims, and drawings in the U.S. Appl. No. 17/540,200, Filing Date: Dec. 1, 2021.

\* cited by examiner

*Primary Examiner* — Ibrahim Siddo
(74) *Attorney, Agent, or Firm* — Winston Hsu

(57) ABSTRACT

A system on a chip (SoC) includes an on-screen display (OSD) circuit, a memory control circuit, and an audio processor. The OSD circuit is arranged to control OSD of a text message. The memory control circuit is coupled to a memory, and is arranged to read a text-to-speech (TTS) data corresponding to the text message from the memory. The audio processor is coupled to the memory control circuit, and includes a TTS circuit, wherein the TTS circuit is arranged to: receive the TTS data from the memory control circuit, and generate an audio output according to at least the TTS data.

8 Claims, 5 Drawing Sheets

SYSTEM ON A CHIP AND DISPLAY SYSTEM

BACKGROUND OF THE INVENTION

1. Field of the Invention

The present invention is related to a display system, and more particularly, to a system on a chip (SoC) applied to a display system, which can integrate a text-to-speech (TTS) circuit having a TTS function and an on-screen display (OSD) circuit arranged to control OSD of a text message into the same chip at a same time.

2. Description of the Prior Art

In a conventional display system, having an OSD menu that can show a text message, if the display system is required to play speech corresponding to the text message through a speaker or a headphone, an additional SoC having a TTS function must be coupled to the exterior of a scaler SoC in the display system, which may result in increased cost. In addition, the display system further needs to control the SoC having a TTS function through a user command interface, which may result in asynchrony between the text message display and the speech playback.

With this in mind, a novel SoC that can integrate a TTS circuit having a TTS function and an OSD circuit arranged to control OSD of a text message into the same chip at a same time is urgently needed.

SUMMARY OF THE INVENTION

It is therefore one of the objectives of the present invention to provide an SoC that can integrate a TTS circuit having a TTS function and an OSD circuit arranged to control OSD of a text message into the same chip at a same time. It is also an objective of the present invention to provide an associated display system.

According to an embodiment of the present invention, an SoC is provided. The SoC may include an OSD circuit, a memory control circuit, and an audio processor. The OSD circuit may be arranged to control OSD of a text message. The memory control circuit may be coupled to a memory, and may be arranged to read a TTS data corresponding to the text message from the memory. The audio processor may be coupled to the memory control circuit, and may include a TTS circuit, wherein the TTS circuit may be arranged to: receive the TTS data from the memory control circuit; and generate an audio output according to at least the TTS data.

According to an embodiment of the present invention, a display system is provided. The display system may include a memory and an SoC, wherein the memory may be arranged to store a TTS data. The SoC may include an OSD circuit, a memory control circuit, and an audio processor. The OSD circuit may be arranged to control OSD of a text message. The memory control circuit may be coupled to the memory, and may be arranged to read the TTS data from the memory, wherein the TTS data corresponds to the text message. The audio processor may be coupled to the memory control circuit, and may include a TTS circuit, wherein the TTS circuit may be arranged to: receive the TTS data from the memory control circuit; and generate an audio output according to at least the TTS data.

One of the benefits of the present invention is that, since the SoC of the present invention integrates the TTS circuit having the TTS function and the OSD circuit arranged to control OSD of the text message into the same chip, asynchrony between the text message display and the speech playback can be greatly improved. In addition, since there is no need to couple an additional SoC having a TTS function to the exterior of the scaler SoC in the display system of the present invention, the cost can be greatly reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
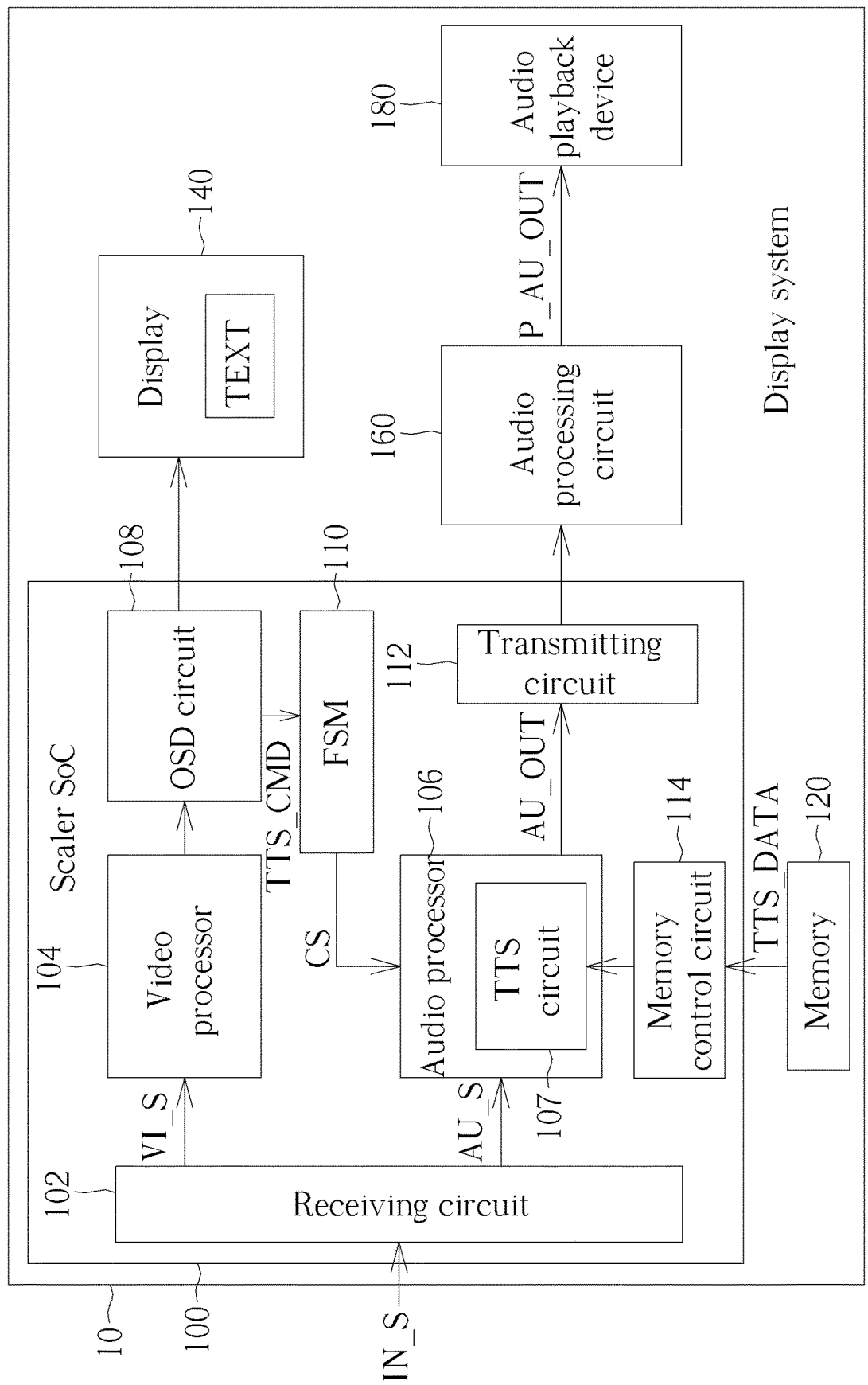
FIG. 1 is a diagram illustrating a display system according to an embodiment of the present invention.

FIG. 1 is a diagram illustrating a display system 10 according to an embodiment of the present invention. As shown in FIG. 1, the display system 10 includes a scaler system on a chip (SoC) 100, a memory 120, a display 140, an audio processing circuit 160, and an audio playback device 180, wherein the memory 120 may be a random access memory (RAM) or a serial peripheral interface (SPI) flash memory, but the present invention is not limited thereto. The scaler SoC 100 includes a receiving circuit 102, a video processor 104, an audio processor 106, an on-screen display (OSD) circuit 108, a finite-state machine (FSM) 110, a transmitting circuit 112, and a memory control circuit 114. The receiving circuit 102 may be arranged to receive an input signal IN_S, wherein the input signal IN_S may include a video signal VI_S and an audio signal AU_S. For example, the input signal IN_S may be a display port (DP) signal, a high definition multimedia interface (HDMI) signal, a video graphics array (VGA) signal, or an AUX IN signal.

The video processor 104 may be coupled to the receiving circuit 102, and may be arranged to process the video signal VI_S, wherein when a text message TEXT is required to be shown on the display 140, the video processor 104 may notify the OSD circuit 108 to perform related processing. Since the video processor 104 in the display system 10 is well known to those skilled in the art, and the operation of the video processor 104 is not the focus of the present invention, only the operations of the audio processor 106, the OSD circuit 108, and the FSM 110 are described in detail herein. The OSD circuit 108 may be coupled to the video processor 104 and the display 140, and may be arranged to control OSD of the text message TEXT. The memory 120 may be arranged to store a text-to-speech (TTS) data TTS_DATA corresponding to the text message TEXT. It should be noted that, in order to save memory space, the TTS data TTS_DATA may be a monaural audio signal. The memory control circuit 114 may be coupled to the memory 120, and may read the TTS data TTS_DATA from the memory 120. The audio processor 106 may be coupled to the receiving circuit 102, and may be arranged to receive the audio signal AU_S. In addition, the audio processor 106 may be further coupled to the memory control circuit 114, and may include a TTS circuit 107, wherein the TTS circuit 107 may be arranged to: receive the TTS data TTS_DATA from the memory control circuit 114; and generate an audio output A OUT according to at least the TTS data TTS_DATA. The FSM 110 may be coupled between the audio processor 106 and the OSD circuit 108, and may receive a TTS command TTS_CMD from the OSD circuit 108, and transmit a control command CS to the audio processor 106 according to the TTS command TTS_CMD, for controlling the audio processor 106 to generate the audio output AU_OUT according to at least the TTS data TTS_DATA.

Under a condition that the TTS circuit 107 in the audio processor 106 receives the TTS data TTS_DATA from the memory control circuit 114 and the audio processor 106 does not receive the audio signal AU_S from the receiving circuit 120, the FSM 110 transmits the control command CS to the audio processor 106 according to the TTS command TTS_CMD, for controlling the audio processor 106 (more particularly, the TTS circuit 107) to generate the audio output AU_OUT only according to the TTS data TTS_DATA. In another example, under a condition that the audio processor 106 receives the audio signal AU_S from the receiving circuit 120 and the TTS circuit 107 receives the TTS data TTS_DATA from the memory control circuit 114, the FSM 110 transmits the control command CS to the audio processor 106 according to the TTS command TTS_CMD, for controlling the audio processor 106 (more particularly, the TTS circuit 107) to perform mixing processing according to the audio signal and the TTS data, in order to generate the audio output AU_OUT.

The transmitting circuit 112 may be coupled to the audio processor 106, and may be arranged to transmit the audio output AU_OUT to the audio processing circuit 160, wherein the transmitting circuit 112 may be an integrated interchip sound (I2P) transmitting circuit, a Sony/Philips Digital Interface Format (S/PDIF) transmitting circuit, or an AUX IN transmitting circuit. The audio processing circuit 160 may be coupled to the transmitting circuit 112, and may perform audio processing upon the audio output AU_OUT transmitted by the transmitting circuit 112, to generate a processed audio output P_AU_OUT. For example, the audio processing circuit 160 may include an audio codec and an audio amplifier SoC, but the present invention is not limited thereto. The audio playback device 180 may be coupled to the audio processing circuit 160, and may be arranged to play the processed audio output P_AU_OUT. For example, the audio playback device 180 may be a speaker or a headphone.

Figure 2:
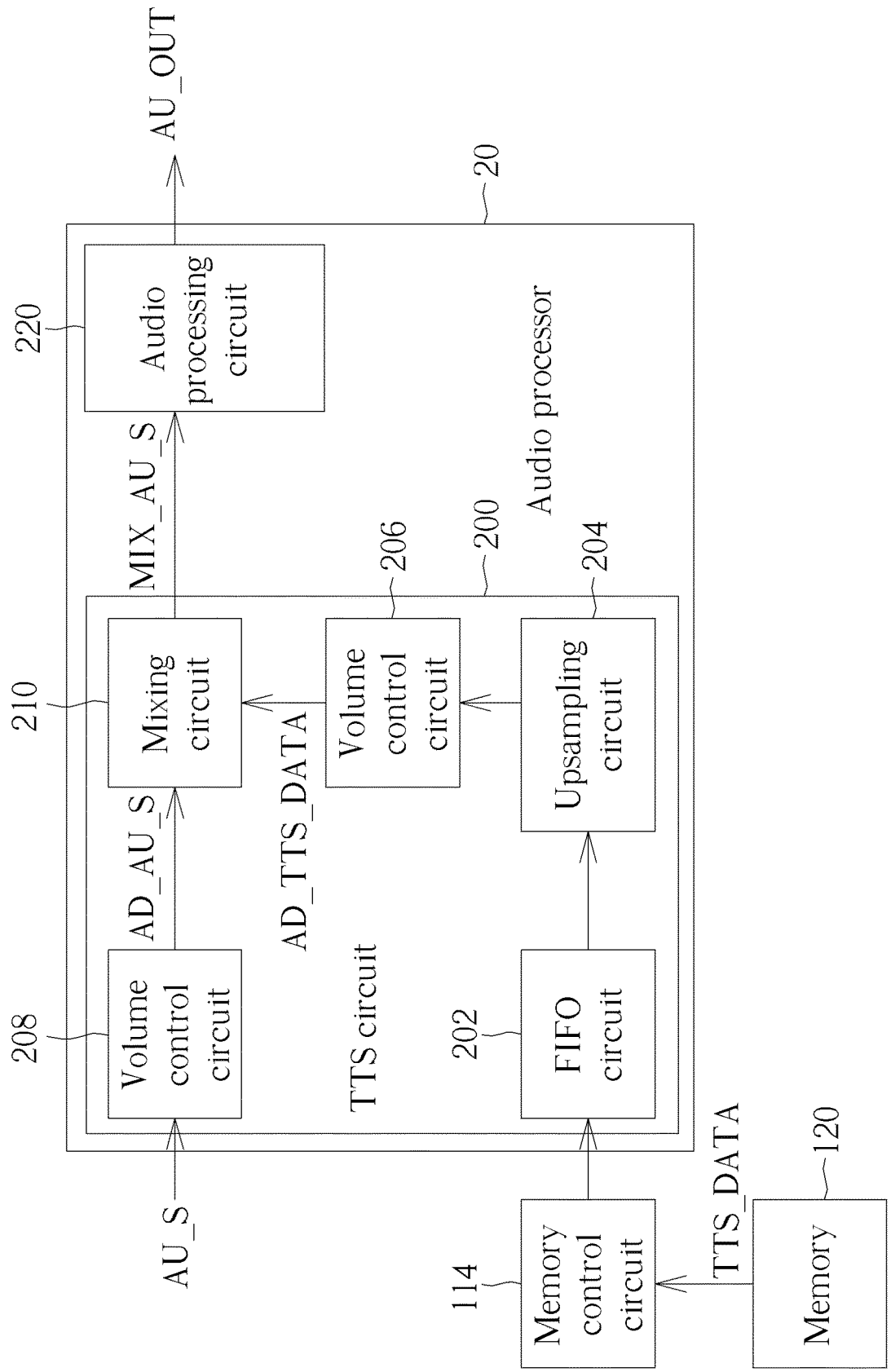
FIG. 2 is a diagram illustrating an audio processor according to an embodiment of the present invention.

FIG. 2 is a diagram illustrating an audio processor 20 according to an embodiment of the present invention, wherein the audio processor 106 shown in FIG. 1 may be implemented by the audio processor 20 shown in FIG. 2. As shown in FIG. 2, the audio processor includes a TTS circuit 200 and an audio processing circuit 220. The TTS circuit 200 includes a first in first out (FIFO) circuit 202, an upsampling circuit 204, volume control circuits 206 and 208, and a mixing circuit 210. The FIFO circuit 202 may be coupled to the memory control circuit 114, and may be arranged to receive the TTS data TTS_DATA from the memory control circuit 114. The upsampling circuit 204 may be coupled to the FIFO circuit 202, and may be arranged to perform upsampling processing upon the TTS data TTS_DATA. For example, if the audio processor 20 receives the audio signal AU_S, the upsampling circuit 204 may be arranged to: perform frequency-increasing upon the TTS data TTS_DATA to make a sampling rate of the TTS data TTS_DATA be the same as a sampling rate of the audio signal AU_S; adjust data size of the TTS data TTS_DATA to make a bit depth of the TTS data TTS_DATA be the same as a bit depth of the audio signal AU_S; and/or map the TTS data TTS_DATA from the monaural audio signal to a binaural audio signal. In another example, if the audio processor 20 does not receive audio signal AU_S, the upsampling circuit 204 may be arranged to: perform frequency-increasing upon the TTS data TTS_DATA to make the sampling rate of the TTS data TTS_DATA be the same as a predetermined sample rate; adjust data size of the TTS data TTS_DATA to make the bit depth of the TTS data TTS_DATA be the same as a predetermined bit depth; and/or map the TTS data TTS_DATA from the monaural audio signal to the binaural audio signal.

The volume control circuit 206 may be coupled to the upsampling circuit 204, and may be arranged to perform volume control upon the TTS data TTS_DATA to generate an adjusted TTS data AD_TTS_DATA. The volume control circuit 208 may be arranged to receive the audio signal AU_S, and perform volume control upon the audio signal AU_S to generate an adjusted audio signal AD_AU_S. The mixing circuit 210 may be coupled to the volume control circuits 206 and 208, and may be arranged to mix the adjusted TTS data AD_TTS_DATA and the adjusted audio signal AD_AU_S to generate a mixed audio signal MIX_AU_S. For example, if the audio processor 20 receives the audio signal AU_S, the mixing circuit 210 may mix the adjusted TTS data AD_TTS_DATA and the adjusted audio signal AD_AU_S to generate the mixed audio signal MIX_AU_S (i.e. the audio output AU_OUT is generated according to the mixed audio signal MIX_AU_S). In another example, if the audio processor 20 does not receive the audio signal AU_S, the mixing circuit 210 may directly transmit the adjusted TTS data AD_TTS_DATA to the audio processing circuit 220 (i.e. the audio output AU_OUT is generated according to the adjusted TTS data AD_TTS_DATA) for subsequent processing. The audio processing circuit 220 may be coupled to the mixing circuit 210, and may perform audio processing upon the mixed audio signal MIX_AU_S (or the adjusted TTS data AD_TTS_DATA) to generate the audio output AU_OUT. For example, the audio processing circuit 220 may include a volume control circuit (not shown), and the volume control circuit may be arranged to perform volume control upon the mixed audio signal MIX_AU_S (or the adjusted TTS data AD_TTS_DATA) to generate the audio output AU_OUT.

Figure 3:
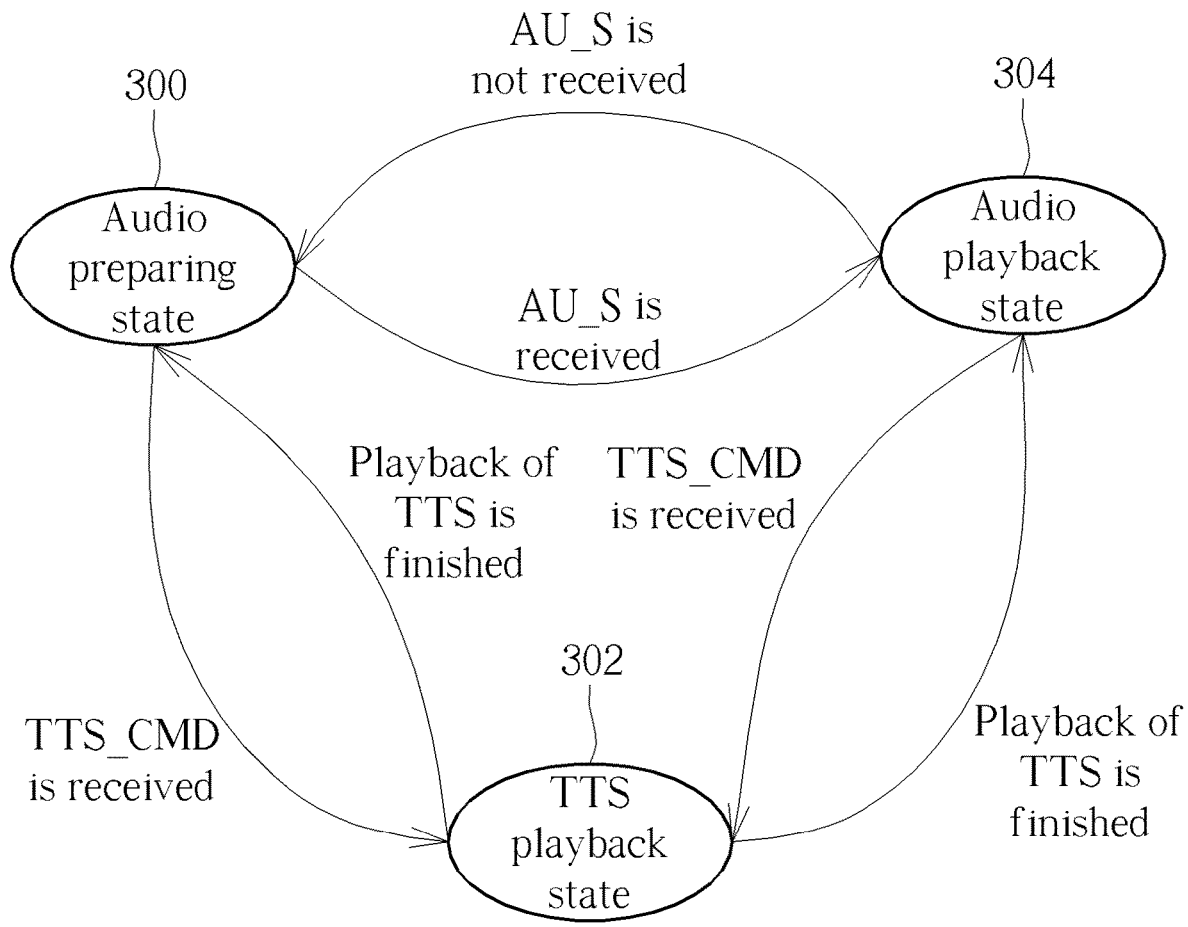
FIG. 3 is a flow chart illustrating controlling a text-to-speech circuit by a finite-state machine shown in FIG. 1 according to an embodiment of the present invention.

FIG. 3 is a flowchart illustrating controlling the TTS circuit 107 by the FSM 110 shown in FIG. 1 according to an embodiment of the present invention, wherein the audio processor 106 and the TTS circuit 107 shown in FIG. 1 may be implemented by the audio processor and the TTS circuit 200 shown in FIG. 2. The FSM 110 may transmit the control command CS to the audio processor 106 according to the TTS command TTS_CMD from the OSD circuit 108, for controlling the audio processor 106 (more particularly, the TTS circuit 107) to generate the audio output AU_OUT according to at least the TTS data TTS_DATA. As shown in FIG. 3, an initial state of the FSM 110 is an audio preparing state 300, and states of the FSM 110 may further include a TTS playback state 302 and an audio playback state 304. When the FSM 110 is in the audio preparing state 300, the FSM 110 waits for the TTS circuit 107 to receive the audio signal AU_S or waits to receive the TTS command TTS_CMD from the OSD circuit 108.

Under a condition that the FSM 110 is initially in the audio preparing state 300, when the FSM 110 receives the TTS command TTS_CMD from the OSD circuit 108, the state of the FSM 110 is transferred from the audio preparing state 300 to the TTS playback state 302, and the FSM 110 controls the TTS circuit 107 to generate the audio output AU_OUT only according to the TTS data TTS_DATA (more particularly, the adjusted TTS data AD_TTS_DATA) by the control command CS. After the TTS circuit 107 generates the audio output AU_OUT (e.g. after the audio playback device 180 finishes playing the processed audio output P_AU_OUT), the state of the FSM 110 is transferred from the TTS playback state 302 to the audio preparing state 300.

Under a condition that the FSM 110 is initially in the audio preparing state 300, when the TTS circuit 107 receives the audio signal AU_S, the state of the FSM 110 is transferred from the audio preparing state 300 to the audio playback state 304 for controlling playback of the audio signal AU_S, and the FSM 100 controls the TTS circuit 107 to generate the audio output AU_OUT only according to the audio signal AU_S (more particularly, the adjusted audio signal AD_AU_S) by the control command CS. After the TTS circuit 107 does not receive the audio signal AU_S, the state of the FSM 110 is transferred from the audio playback state 304 to the audio preparing state 300.

Under a condition that the FSM 110 is initially in the audio playback state 304, when the FSM 110 receives the TTS command TTS_CMD from the OSD circuit 108, the state of the FSM 110 is transferred from the audio playback state 304 to the TTS playback state 302, and the FSM 110 controls the TTS circuit 107 to perform mixing processing according to the audio signal AU_S and the TTS data TTS_DATA (i.e. mix the adjusted audio signal AD_AU_S and the adjusted TTS data AD_TTS_DATA to generate the mixed audio signal MIX_AU_S) by the control command CS, to generate the audio output AU_OUT according to the mixed audio signal MIX_AU_S. After the TTS circuit 107 generates the audio output AU_OUT (e.g. after the audio playback device 180 finishes playing the processed audio output P_AU_OUT), the state of the FSM 110 is transferred from the TTS playback state 302 to the audio playback state 304, to keep playing the audio signal AU_S.

Figure 4:
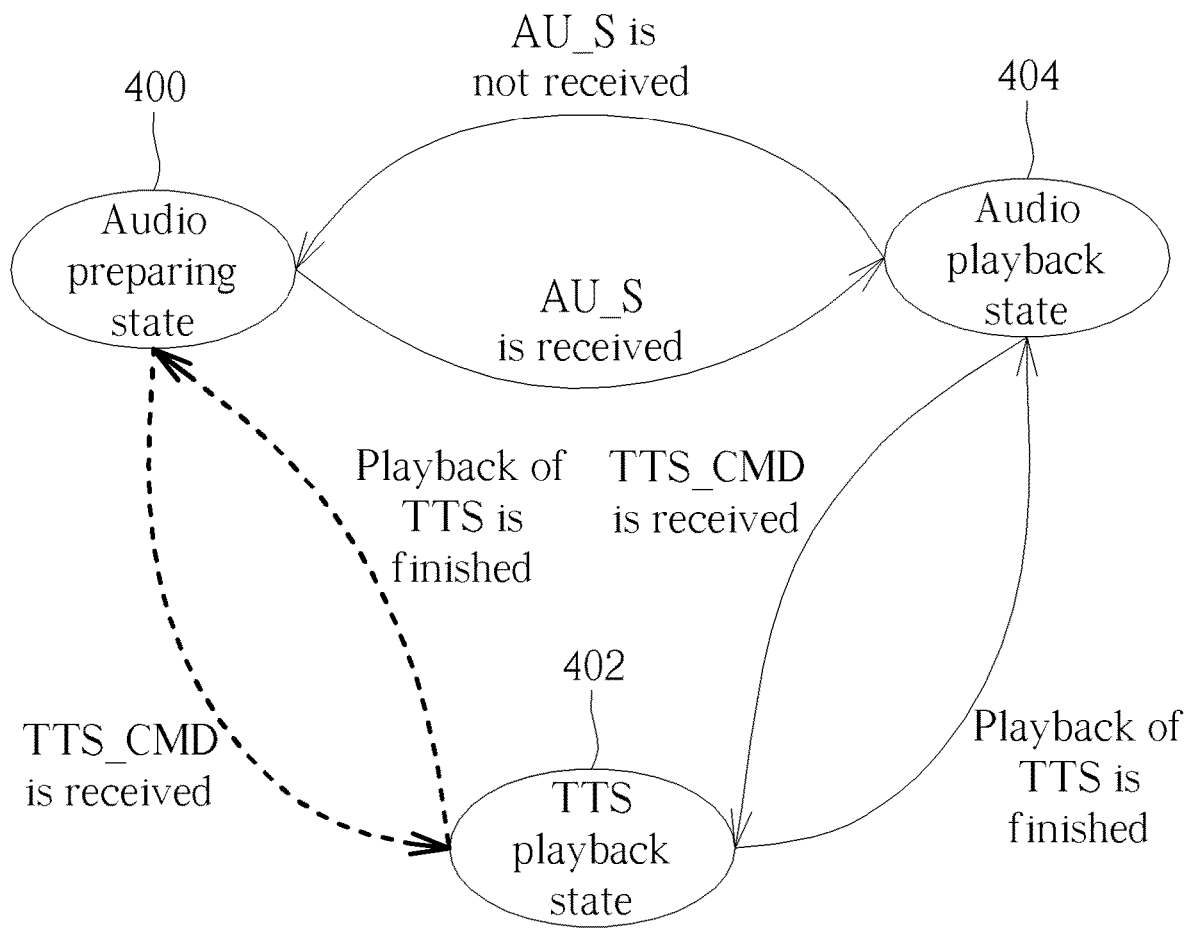
FIG. 4 is an example of the flow chart shown in FIG. 3 according to an embodiment of the present invention.

FIG. 4 is an example of the flow chart shown in FIG. 3 according to an embodiment of the present invention, wherein the audio processor 106 and the TTS circuit 107 shown in FIG. 1 may be implemented by the audio processor 20 and the TTS circuit 200 shown in FIG. 2. In this embodiment, the audio processor 20 does not receive the audio signal AU_S, and the predetermined sample rate and the predetermined bit depth are set as 48 kHz and 24 bits, respectively, by the upsampling circuit 204. In addition, in this example, the transfer of the state of the FSM 110 may be illustrated by dashed lines. When the OSD of the text message TEXT is required to be controlled, the OSD circuit 108 may transmit the TTS command TTS_CMD to the audio processor 20, and the state of the FSM 110 may be transferred from an audio preparing state 400 to a TTS playback state 402 for playing the TTS data TTS_DATA. The memory control circuit 114 may be arranged to read the TTS data TTS_DATA corresponding to the text message TEXT from the memory 120. After the TTS circuit 200 receives the TTS data TTS_DATA from the memory control circuit 114, the upsampling circuit 204 may be arranged to: perform frequency-increasing upon the TTS data TTS_DATA to make the sample rate of the TTS data TTS_DATA be the same as the predetermined sample rate (i.e. 48 kHz); adjust the data size of the TTS data TTS_DATA to make the bit depth of the TTS data TTS_DATA be the same as the predetermined bit depth (i.e. 24 bits); and/or map the TTS data TTS_DATA from the monaural audio signal to the binaural audio signal.

Afterwards, the volume control circuit 206 may perform volume control upon the TTS data TTS_DATA to generate the adjusted TTS data AD_TTS_DATA. For example, the volume control circuit 206 may be arranged to adjust a volume setting for playing the TTS data TTS_DATA from 0% to 80%. Although the audio processor 20 does not receive the audio signal AU_S, the volume control circuit 208 may still set a volume setting for playing the audio signal AU_S to be maintained at a predetermined volume (e.g. 0%). The mixing circuit 210 may be arranged to directly transmit the adjusted TTS data AD_TTS_DATA to the audio processing circuit 220 for subsequent processing (i.e. the audio output AU_OUT is generated according to the adjusted TTS data AD_TTS_DATA). The audio processing circuit 220 may perform audio processing upon the adjusted TTS data AD_TTS_DATA to generate the audio output AU_OUT. After the TTS circuit 200 generates the audio output AU_OUT (e.g. after the audio playback device 180 finishes playing the processed audio output P_AU_OUT), the state of the FSM 110 is transferred from the TTS playback state 402 to the audio preparing state 400. In addition, the audio control circuit 206 may be arranged to adjust the volume setting for playing the TTS data TTS_DATA from 80% to 0%, and the volume control circuit 208 may be arranged to set the volume setting for playing the audio signal AU_S to be maintained at the predetermined volume (e.g. 0%). For brevity, similar descriptions for this embodiment are not repeated in detail here.

Figure 5:
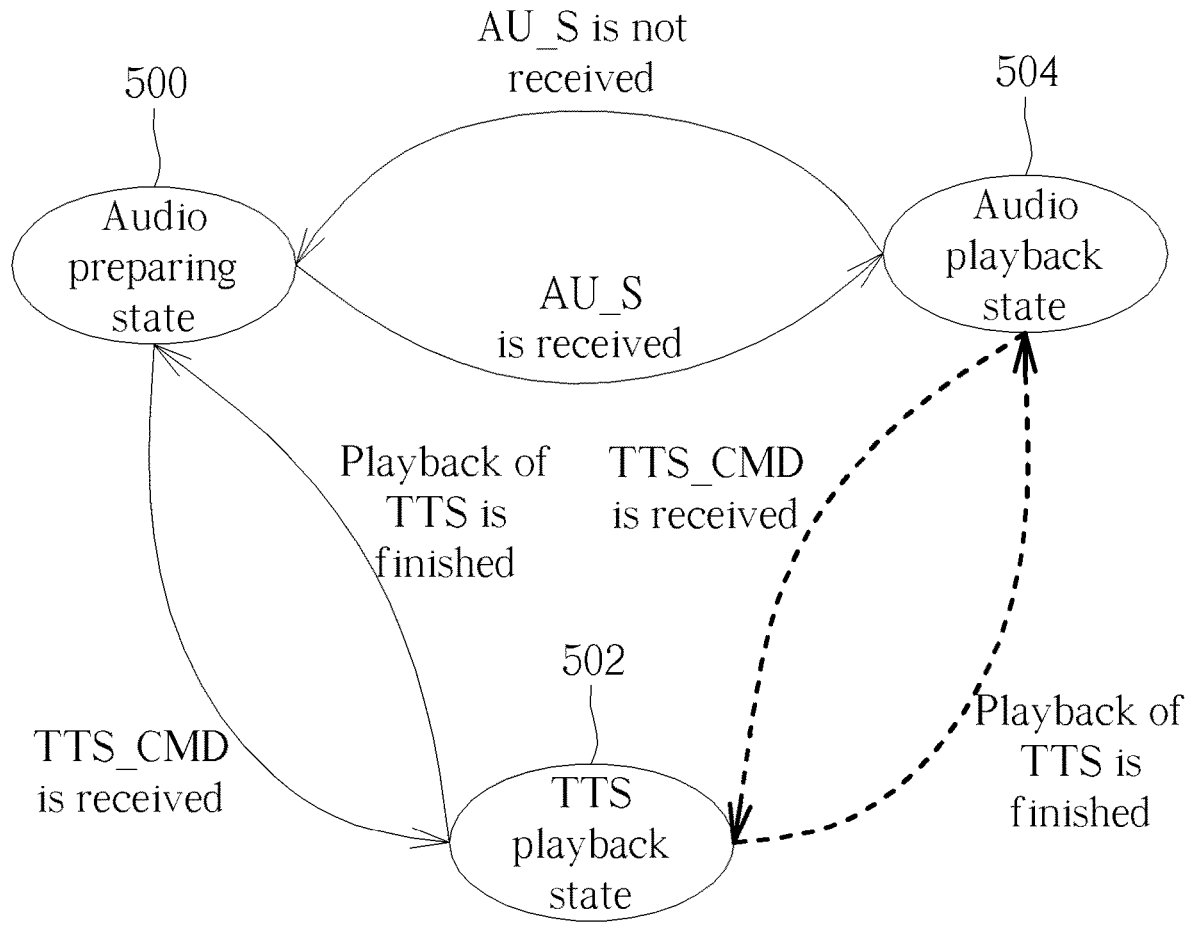
FIG. 5 is another example of the flow chart shown in FIG. 3 according to an embodiment of the present invention.

FIG. 5 is another example of the flow chart shown in FIG. 3 according to an embodiment of the present invention, wherein the audio processor 106 and the TTS circuit 107 shown in FIG. 1 may be implemented by the audio processor 20 and the TTS circuit 200 shown in FIG. 2. In this embodiment, the audio processor 20 receives the audio signal AU_S, wherein the audio signal AU_S is a DP audio signal, and the sample rate and the bit depth of the audio signal AU_S are 96 kHz and 24 bits, respectively. In addition, in this example, the transfer of the state of the FSM 110 may be illustrated by dashed lines. Initially, the FSM 110 is in an audio playback state 504. When the FSM 110 receives the TTS command TTS_CMD from the OSD circuit 108, the state of the FSM 110 is transferred from the audio playback state 504 to a TTS playback state 502, and the FSM 110 controls the TTS circuit 200 to perform mixing processing according to the audio signal AU_S and the TTS data TTS_DATA by the control command CS. The memory control circuit 114 may be arranged to read the TTS data TTS_DATA corresponding to the text message TEXT from the memory 120. After the TTS circuit 200 receives the TTS data TTS_DATA from the memory control circuit 114, the upsampling circuit 204 may be arranged to: perform frequency-increasing upon the TTS data TTS_DATA to make the sample rate of the TTS data TTS_DATA be the same as the sample rate of the audio signal AU_S (e.g. the sample rate of the TTS data TTS_DATA is equal to 96 kHz); adjust the data size of the TTS data TTS_DATA to make the bit depth of the TTS data TTS_DATA be the same as the bit depth of the audio signal (i.e. the bit depth of the TTS data TTS_DATA is equal to 24 bits); and/or map the TTS data TTS_DATA from the monaural audio signal to the binaural audio signal.

The volume control circuit 206 may then perform volume control upon the TTS data TTS_DATA to generate the adjusted TTS data AD_TTS_DATA. The volume control circuit 208 may perform volume control upon the audio signal AU_S to generate the adjusted audio signal AD_AU_S. For example, the volume control circuit 206 may be arranged to adjust the volume setting for playing the TTS data TTS_DATA from 0% to 80%, and the volume control circuit 208 may be arranged to adjust the volume setting for playing the audio signal AU_S from a predetermined volume to 20%. The mixing circuit 210 may be arranged to mix the adjusted audio signal AD_AU_S and the adjusted TTS data AD_TTS_DATA to generate the mixed audio signal MIX_AU_S. The audio processing circuit 220 may perform audio processing upon the mixed audio signal MIX_AU_S to generate the audio output AU_OUT. After the TTS circuit 200 generates the audio output AU_OUT (e.g. after the audio playback device 180 finishes playing the processed audio output P_AU_OUT), the state of the FSM 110 is transferred from the TTS playback state 502 to the audio playback state 504, to keep playing the DP audio signal. In addition, the audio control circuit 206 may be arranged to adjust the volume setting for playing the TTS data TTS_DATA from 80% to 0%, and the volume control circuit 208 may be arranged to adjust the volume setting for playing the audio signal AU_S from 20% to the predetermined volume. For brevity, similar descriptions for this embodiment are not repeated.

In summary, since the SoC of the present invention integrates the TTS circuit having the TTS function and the OSD circuit arranged to control OSD of the text message into the same chip, the asynchrony between the text message display and the speech playback can be greatly improved. In addition, since there is no need to couple an additional SoC with TTS function to the exterior of the scaler SoC in the display system, the cost can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system on a chip (SoC), comprising:
    an on-screen display (OSD) circuit, arranged to control OSD of a text message;
    a memory control circuit, coupled to a memory, and arranged to read a text-to-speech (TTS) data corresponding to the text message from the memory;
    an audio processor, coupled to the memory control circuit, and comprising a TTS circuit, wherein the TTS circuit is arranged to:
        receive the TTS data from the memory control circuit; and
        generate an audio output according to at least the TTS data; and
    a finite-state machine (FSM), coupled to the OSD circuit and the audio processor, and arranged to receive a TTS command from the OSD circuit and, according to the TTS command, control the audio processor to generate the audio output according to at least the TTS data;
    wherein an initial state of the FSM is an audio preparing state, and when the FSM is in the audio preparing state, the FSM waits for the TTS circuit to receive an audio signal or waits for receiving the TTS command from the OSD circuit;
    wherein when the TTS circuit receives the audio signal, a state of the FSM is transferred from the audio preparing state to an audio playback state for controlling playback of the audio signal; when the FSM is in the audio playback state and the FSM receives the TTS command from the OSD circuit, the state of the FSM is transferred from the audio playback state to a TTS playback state, and the FSM controls the TTS circuit to perform mixing processing according to the audio signal and the TTS data to generate the audio output; and after the TTS circuit generates the audio output, the state of the FSM is transferred from the TTS playback state to the audio playback state.

2. The SoC of claim 1, wherein the TTS circuit is further arranged to perform volume control upon the TTS data to generate an adjusted TTS data, and the audio output is generated according to the adjusted TTS data.

3. The SoC of claim 1, wherein the TTS circuit is further arranged to:
    receive an audio signal;
    perform volume control upon the audio signal and the TTS data, respectively, to generate an adjusted audio signal and an adjusted TTS data; and
    mix the adjusted audio signal and the adjusted TTS data to generate a mixed audio signal;
    wherein the audio output is generated according to the mixed audio signal.

4. The SoC of claim 3, wherein the TTS circuit comprises:
    an upsampling circuit, arranged to perform frequency-increasing upon the TTS data to make a sampling rate of the TTS data be the same as a sampling rate of the audio signal.

5. The SoC of claim 3, wherein the TTS circuit comprises:
    an upsampling circuit, arranged to adjust data size of the TTS data to make a bit depth of the TTS data be the same as a bit depth of the audio signal.

6. The SoC of claim 1, wherein the TTS circuit is a monaural audio signal, and the TTS circuit comprises:
    an upsampling circuit, arranged to:
        perform frequency-increasing upon the TTS data to make a sampling rate of the TTS data be the same as a predetermined sampling rate;
        adjust data size of the TTS data to make a bit depth of the TTS data be the same as a predetermined bit depth; and
        map the TTS data from the monaural audio signal to a binaural audio signal.

7. The SoC of claim 1, wherein when the FSM receives the TTS command from the OSD circuit, the state of the FSM is transferred from the audio preparing state to the TTS playback state, and the FSM controls the TTS circuit to generate the audio output according to the TTS data; and after the TTS circuit generates the audio output, the state of the FSM is transferred from the TTS playback state to the audio preparing state.

8. A display system, comprising:
    a memory, arranged to store a text-to-speech (TTS) data; and
    a system on a chip (SoC), comprising:
        an on-screen display (OSD) circuit, arranged to control OSD of a text message;
        a memory control circuit, coupled to the memory, and arranged to read the TTS data from the memory, wherein the TTS data corresponds to the text message; and
        an audio processor, coupled to the memory control circuit, and comprising a TTS circuit, wherein the TTS circuit is arranged to:
            receive the TTS data from the memory control circuit; and generate an audio output according to at least the TTS data; and a finite-state machine (FSM), coupled to the OSD circuit and the audio processor, and arranged to receive a TTS command from the OSD circuit and, according to the TTS command, control the audio processor to generate the audio output according to at least the TTS data;

wherein an initial state of the FSM is an audio preparing state, and when the FSM is in the audio preparing state, the FSM waits for the TTS circuit to receive an audio signal or waits for receiving the TTS command from the OSD circuit;

wherein when the TTS circuit receives the audio signal, a state of the FSM is transferred from the audio preparing state to an audio playback state for controlling playback of the audio signal; when the FSM is in the audio playback state and the FSM receives the TTS command from the OSD circuit, the state of the FSM is transferred from the audio playback state to a TTS playback state, and the FSM controls the TTS circuit to perform mixing processing according to the audio signal and the TTS data to generate the audio output; and after the TTS circuit generates the audio output, the state of the FSM is transferred from the TTS playback state to the audio playback state.

\* \* \* \* \*